May 28, 1940.                  G. J. WOREL                  2,202,074
                          OIL PRESSURE REGULATOR
                          Filed Sept. 29, 1938
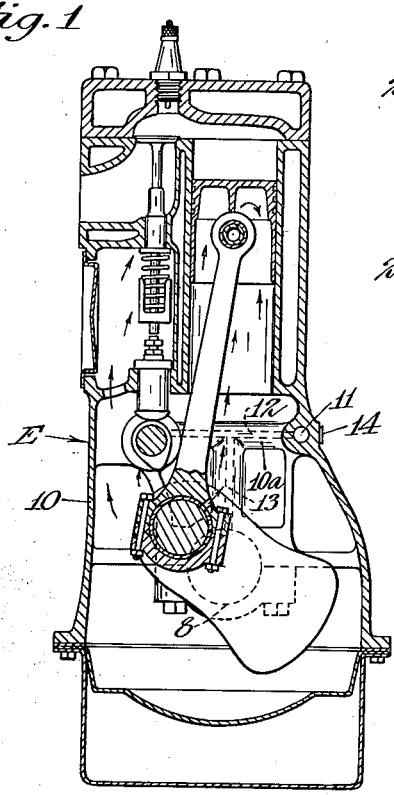
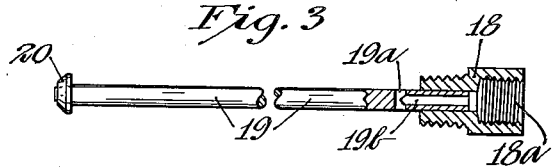
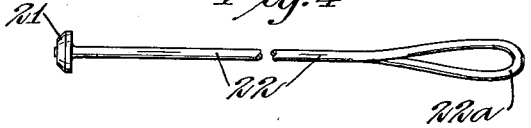
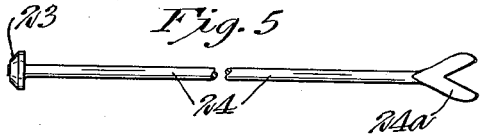
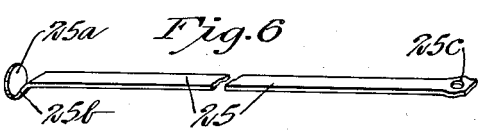
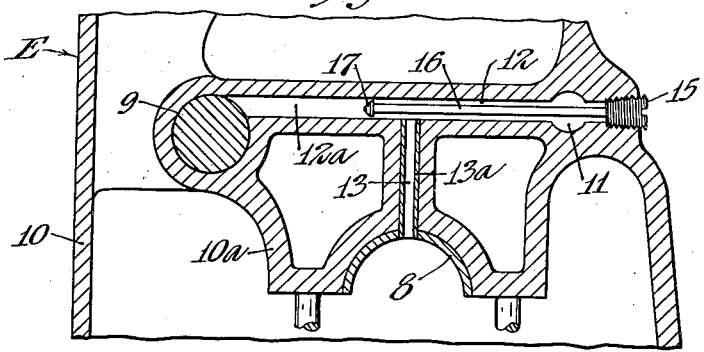
Inventor
Glen J. Worel
By Williamson & Williamson
Attorneys Patented May 28, 1940

2,202,074

UNITED STATES PATENT OFFICE 2,202,074

OIL PRESSURE REGULATOR

Glen J. Worel, Minneapolis, Minn., assignor to Thexton Manufacturing Company, Inc., Minneapolis, Minn., a corporation of Minnesota Application September 29, 1938, Serial No. 232,337

4 Claims. (Cl. 184—6)

My invention relates to lubrication systems of automotive engines and particularly to oil pressure regulators.

In the engines of certain automobiles, ducts for conducting oil under pressure divide into branches leading respectively to the crank shaft main bearings and the cam shaft bearings. In such systems the oil in the crank case is maintained at considerable pressure (usually from 40 to 50 pounds per square inch) and oil is sprayed upon various of the working parts such as the rod bearings, wrist pins and pistons, through ducts and ports formed in some of the lower working parts subjected to said pressure. In many instances the cam shaft bearings of such engines become sufficiently worn to permit leakage of an excessive amount of oil with the result that proper pressure cannot be maintained in the system and an insufficient amount of oil is delivered to the crank shaft bearings. Damage due to reduced oil pressure and consequent improper distribution is not confined to the main bearings alone, but often affects the other above recited parts. Most automotive engines do not have removable cam shaft bearings, and consequently only with difficulty and considerable expense could a motor of the type described be reconditioned to eliminate the leakage of oil and reduction of pressure caused by worn crank shaft bearings.

An object of my invention is to provide an inexpensive means for obtaining proper distribution of oil in engines having worn cam shaft bearings without the need for replacing said bearings.

A more specific object is to provide a simple, readily insertable device for restricting flow of oil to worn cam shaft bearings, whereby normal oil pressure may be maintained, thus assuring delivery and spraying of adequate oil to all oil lubricated parts of the engine.

A further and important object is to provide in a device of the class described, means for accurately locating and maintaining an oil restriction at a point to prevent excess flow of oil to the cam shaft bearings while nevertheless assuring unrestricted delivery of oil to the main bearings and other oil lubricated parts.

These and other objects and advantages of the present invention will more fully appear from the following description made in connection with the accompanying drawing, in which like reference characters refer to the same or similar parts throughout the various views, and in which:

Fig. 1 is a vertical sectional view of an automotive engine of a type adapted for use of my device therein;

Fig. 2 is a partial vertical sectional view of the engine of Fig. 1 drawn to enlarged scale with an embodiment of my invention operatively associated therewith;

Fig. 3 is a broken, partially sectional view, drawn to enlarged scale of another form of my device, and Figs. 4 to 7 inclusive, illustrate still other forms of my device.

Referring to the drawing, Figs. 1 and 2 show an automobile engine E having main crank shaft bearings 8 and cam shaft bearings 9 lubricated by oil delivered thereto under pressure. The engine E includes a crank case casting 10 including cross pieces 10a each of which carries a crank shaft bearing 8 and a cam shaft bearing 9. The crank case casting 10 is provided with a longitudinally extending oil header duct 11 supplied with oil under pressure in a conventional manner. Each cross piece 10a is provided with a duct 12 therein intersecting the header duct 11 for communication therewith and extending to and communicating with the corresponding cam shaft bearing 9 for delivery of oil thereto. A branch duct 13 runs from the medial portion of the duct 12 to the corresponding one of the main bearings 8 for delivery of oil thereto and may be lined with a tubular element 13a as shown. The ducts 11, 12 and 13 are formed within the material of the crank case casting 10 in a suitable manner as, for example, by coring. The portion 12a of the duct 12 extending from the cam shaft bearing 9 to the junction between the branch ducts 12 and 13 may be considered as one of two branch ducts fed from a main duct constituting the portion of the duct 12 extending from the header duct 11 to said junction. The duct 12 extends at its right hand end, as viewed in Figs. 1 and 2, to the right hand outer face of the crank case casting 10 and is closed at its right hand end by means of a screw-threaded plug 14 engaged in internal screw-threads formed in the portion of the crank case casting 10 defining the right hand end of the duct 12.

In an engine such as the engine E which has not as yet become worn to any extent in any of its parts, oil delivered through the duct 12 will so divide between the branch ducts 13 and 12a that the proper amount of oil for thorough lubrication will be delivered through each of the branch ducts 13 and 12a to the bearing served thereby. In the usual lubrication system, oil delivered through the duct 13 not only lubricates the main bearing 8, but is also conducted by suitable means to the connecting rod bearings, and oil sprayed from the main and connecting rod bearings is relied upon for lubrication of various parts including the wrist-pins and pistons to which the oil is delivered by means of spray effect. In many engines such as the engine E, the cam shaft bearings 9, when wear thereof has progressed to a certain extent, permit passage therepast of an excessive amount of oil. The excessive flow of oil to the cam shaft bearings results in lessening the pressure in the lubrication system and consequently in an inadequate supply of oil to the main bearings with the accompanying danger of damage to the main bearings, connecting rod bearings, wrist pin bearings, pistons and other parts. This dangerous condition is ordinarily corrected at considerable expense by replacing the cam shaft bearings.

In accordance with my invention I provide quickly and easily installed means for restricting the flow of oil through the branch ducts 12a to the cam shaft bearings 9.

Referring to the form of my device shown in Fig. 2, I provide a screw threaded plug 15 to be substituted for the plug 14 previously described. An elongated element 16, such as a metal rod, is mounted on the inner side of the plug 15 to project therefrom through the duct 12 to a point within the branch duct 12a as shown. The rod 16 is of less diameter than the duct 12 so as to leave space around the rod 16 for passage of oil. A circular element 17 for restricting flow of oil in the branch duct 12a is mounted on the free end of the rod 16. The element 17 is slightly smaller in diameter than the branch duct 12a and is preferably beveled at the outer side thereof. The element 17 greatly limits the cross sectional area of the space therearound through which oil flows to the cam shaft bearing 9. This restriction prevents excessive flow of oil to the cam shaft bearing 9 and, hence, enables the maintenance of normal oil pressure in the ducts 11 and 12, so that an adequate supply of oil is thus delivered through the duct 13 to the main bearing 8.

In cases where a conduit coupling is used in place of the plug 14, my device takes the form shown in Fig. 3. An axially bored plug 18 is provided to be substituted for the plug 14. The plug 18 is apertured and internally screw threaded at 18a to receive any conventional type of fitting for connecting a conduit to the plug 18. A rod 19 generally similar to the previously described rod 16 is mounted in the plug 18 to project inwardly from the inner side thereof and an oil restricting element 20, similar to the previously described element 17, is mounted on the free end of the rod 19. To enable passage of oil between the duct 12 and any conduit connected to the plug 18, the rod 19 is provided with a diametrical aperture 19a communicating with an axially extending aperture 19b which is in communication with the apertured and internally screw threaded portion 18a of the plug 18.

In cases where it is not desired to replace the plug 14 with another plug, the rod of my device may be arranged to frictionally restrain the same from longitudinal movement in the duct 12. The forms of my device shown in Figs. 4 to 6 inclusive, are of such a type and, when the plug 14 is temporarily removed, may be driven into position in the duct 12.

The form of the device shown in Fig. 4 includes an oil restricting element 21 carried by a rod 22. The end of the rod 22 opposite the element 21 is bent back upon itself to form a relatively resilient loop 22a. The maximum width of the loop 22a is such that the same when driven into the duct 12 will be in firm frictional engagement with portions of the casting 10 defining the duct 12. After driving the device of Fig. 4 into place within the duct 12, the plug 14 may be replaced in its normal position.

In the device of Fig. 5, I provide an oil restricting element 23 carried by a rod 24. The end 24a of the rod 24 opposite the element 23 is flattened, split and spread as shown, so that the spread portion thus formed may frictionally engage portions of the casting 10 defining the duct 12 in much the same manner as the loop 22a of the device shown in Fig. 4.

The device shown in Fig. 6 functions in the same manner as the forms previously described, but is so designed that it may be made from sheet metal so as to avoid the type of machine operations required in construction of the previously described forms. A strip 25 of sheet metal slightly narrower than the diameter of the duct 12 is notched and shaped at its left hand end as viewed in Fig. 6, to form a disk 25a joined to the main portion of the strip 25 by a neck 25b of reduced width. The neck 25b is bent in such a manner that the disk 25a will be disposed concentrically of the longitudinal axis of the strip 25 in a plane normal to said axis. The duct 25a constitutes an oil restricting element functioning in the same manner as the oil restricting elements 17, 20, 21 and 23 of the previously described forms of the device. The right hand end portion of the strip 25 is provided with an aperture 25c and the apertured portion is spread so as to have a width such that the apertured portion will frictionally engage the portions of the casting 10 defining the duct 12 in much the same manner as the loop 22a of Fig. 4, or the spread portion 24a of Fig. 5.

In Fig. 7 I show a device wherein a spherical element 26 of slightly less diameter than the branch duct 12a is utilized as an oil restricting element. The spherical element 26 is mounted on a rod 27 which may be arranged at its right hand end for retention in the duct 12 in accordance with any one of the forms of the device shown in Figs. 2 to 5 inclusive.

The combinative functions of all forms of my invention shown in Figs. 3 to 7 inclusive, with the oil ducts of the automotive engine, is substantially identical. In each instance the oil restricting element is anchored and spaced a predetermined distance from the entrance to oil duct 12 and at a point inwardly of a connection between oil duct 12 and the branch duct 13. In such position flow of oil to the branch duct 13 is always unrestricted, while the passage of oil through ducts 12a to the cam shaft bearings is substantially restricted, thereby affecting maintenance of the proper operating oil in the lubricating system which, of course, assures delivery of an adequate supply of oil to the main bearings 8 and sufficient spray force of such oil for properly supplying lubrication to the working parts, such as the wrist pins, pistons and other parts dependent for lubrication upon oil delivered through the main bearing.

The anchoring and retaining means in my device not only determines the proper operating position of restriction element 17, but prevents outward displacement of said element through partial vacuum when the engine is stopped and the oil cools.

It is apparent that I have invented a simple, compact, effective and inexpensive device for correcting improper distribution of oil in the lubrication systems of automobile engines in which an excessive flow of oil exists in certain branch ducts of the system.

It will, of course, be understood that various changes may be made in the form, details, arrangement and proportions of the various parts without departing from the scope of my invention.

What is claimed is:

1. In combination with an automotive engine lubrication system having a first oil duct leading from a normally plugged end thereof through an intersection thereof with a main oil passage to a first bearing and a branch duct to a second bearing branching from said first duct between said intersection and said first bearing, oil pressure regulating means comprising, a relatively slender member adapted to be placed in said first duct and of a length to extend from said normally plugged end to a point beyond said branch duct, an enlarged element attached to one end of said member and adapted to be secured in said normally plugged end, and an oil-restrictive element of somewhat less diameter than said first duct attached to the remaining end of said member to be maintained thereby in said first duct beyond said branch duct.

2. In combination with an automotive engine lubrication system having a straight oil duct leading from a normally plugged end thereof through an intersection thereof with a main oil passage to a first bearing and a branch duct to a second bearing branching from said straight duct at an angle thereto between said intersection and said first bearing, oil pressure regulating means comprising, a relatively slender straight member of a length to extend from said normally plugged end to a point beyond said branch duct, an enlarged element attached to one end of said member and adapted to be secured in said normally plugged end, and an oil flow restricting element of somewhat less diameter than said straight duct attached to the remaining end of said member to be maintained thereby in said straight duct beyond said branch duct.

3. In combination with an automotive engine lubrication system having a straight oil duct leading from a plug-receiving opening through an intersection of said duct with a main oil passage to a first bearing and a branch duct to a second bearing branching off said duct generally radially of the portion thereof between said intersection and said first bearing, oil pressure regulating means comprising, a plug adapted to be secured in said opening, an oil restrictive element of slightly less diameter than said straight duct disposable therein between said branch duct and said first bearing, and a relatively slender and rigid straight element attached at its respective ends to said plug and said restrictive element and having such length as to maintain said restrictive element disposed as described when said plug is secured in said opening.

4. In combination with an automotive engine lubrication system having a first oil duct leading from an internally screw-threaded open end thereof through an intersection thereof with a main oil passage to a first bearing and a branch duct to a second bearing branching from said first duct at an angle thereto between said intersection and said first bearing, oil pressure regulating means comprising, a screw-threaded plug adapted to be screwed into said open end, a relatively slender member projecting from the inner end of said plug and of a length to extend to a point in said first duct beyond said branch duct, and an oil flow restrictive element of somewhat less diameter than said first duct attached to the free end of said member.

GLEN J. WOREL.